A. TYLER.
RESILIENT TIRE.
APPLICATION FILED NOV. 5, 1912.
1,092,963.
Patented Apr. 14, 1914.
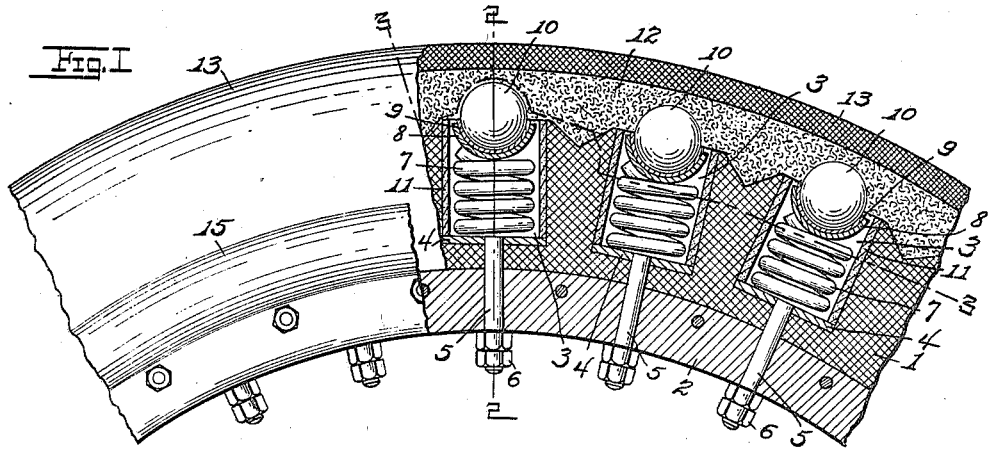
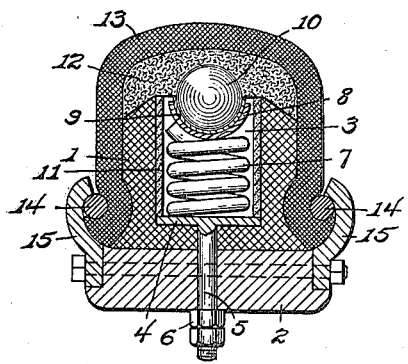
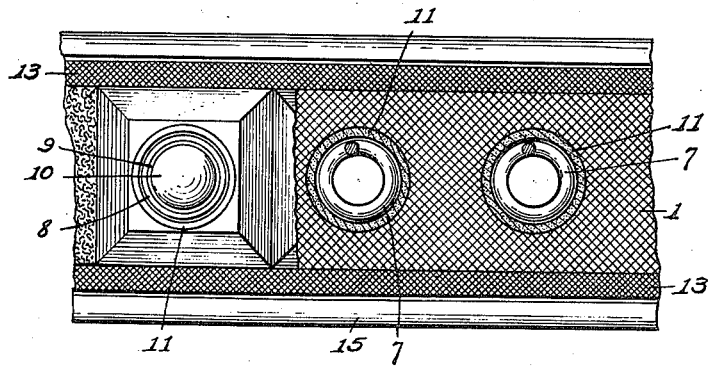
WITNESSES:
INVENTOR
Augustus Tyler
By
ATTORNEY.

UNITED STATES PATENT OFFICE.

AUGUSTUS TYLER, OF WHEELING, WEST VIRGINIA.

RESILIENT TIRE.

1,092,963.
Specification of Letters Patent.
Patented Apr. 14, 1914.

Application filed November 5, 1912. Serial No. 729,618.

*To all whom it may concern:*

Be it known that I, AUGUSTUS TYLER, a citizen of the United States of America, and resident of Wheeling, county of Ohio, and State of West Virginia, have invented certain new and useful Improvements in Resilient Tires, of which the following is a specification.

This invention relates to resilient tires for vehicles, and more particularly to a tire which is adapted for use on automobiles.

The primary object of the invention is to provide a strong, durable and efficient tire for automobiles and other vehicles, which shall possess to a marked extent the resilient features of a pneumatic tire and shall at the same time be devoid of the objectionable features of the pneumatic type of tires.

A further object is to provide a tire of the character mentioned which is readily applicable to the various standard types of wheel-rims now in common use.

With these and other objects in view, the invention resides in the features of construction, arrangement of parts, and combinations of elements which will hereinafter be fully described, reference being had to the accompanying drawings, forming a part of this specification, in which—

Figure 1 is a view partly in side elevation and partly in longitudinal section, showing the invention applied to a wheel-rim; Fig. 2 is a transverse section of the same on the line 2—2, Fig. 1; and Fig. 3 is a substantially horizontal section on the line 3—3, Fig. 1.

Referring to said drawings, in which like designating characters distinguish like parts throughout the several views 1 indicates a relatively thick circular pad of a tough, resilient material, preferably soft, porous rubber, having a plain base adapted to rest upon a wheel-rim 2. Located at suitable spaced intervals in said pad 1 is a plurality of tubular pockets 3 which extend in a radial direction from the outer periphery of said pad partially through the latter, and seated in the bottom of each pocket is the circular head 4 of an anchor bolt 5 which penetrates that portion of the pad between the pocket and the wheel rim and is projected through the latter, said bolt serving to maintain said pad in firmly seated position on said rim. A nut or nuts 6 on the projecting threaded end of the bolt maintains the latter in place.

Seated on the head 4 of said bolt is the lower end of a coil spring 7 which has a steel cup 8 mounted upon its upper end, said cup preferably having an asbestos lining 9 whereby the generation of an injurious degree of heat due to frictional movement of a metal ball 10 seated within said cup is prevented. To prevent the walls of the pocket 3 from collapsing in such manner as to interfere with the action of the spring 7, a close-fitting tube 11 of asbestos or other suitable material, is inserted in the pocket to inclose the spring, said tube constituting a reinforcement of said walls.

Cemented or otherwise firmly attached to the rubber pad 1, and overlying the latter and the balls 10, which latter constitute anti-friction elements, is a pad 12 of a suitable pliant wear-resisting material, preferably compressed asbestos, whose outer face presents a rounded contour adapting it for fitting closely against the inner surface of the tread portion of a shoe or casing 13 which envelops the tire parts, as is clearly shown in Fig. 2. The tire with its casing is held in place on the rim in any appropriate manner, as by removable metal rings 14 seated behind flanges or beads 15 detachably secured to the rim of the wheel.

From the foregoing it will be apparent that road shocks will, in a great measure, be absorbed by the springs and that the resiliency of the tire will compare favorably with that of a tire of the pneumatic type.

It will be obvious that various changes may be made in the details of construction without departing from the general spirit or scope of the invention as defined in the appended claims. Hence, I do not desire to limit myself to the precise construction and arrangement of parts herein shown and described.

Having thus described my invention, what I claim as new, and desire to secure by Letters Patent, is—

1. A tire comprising a resilient pad shaped to conform to the periphery of a wheel-rim and having therein a plurality of radially-directed pockets located at spaced intervals, anchor bolts having their heads seated in the bottoms of said pockets and adapted to have their ends projected through a wheel-rim, springs seated in said pockets, a cup seated on the outer end of each spring, a ball seated in said cup, means reinforcing the walls of said pockets, a pliable covering attached to the periphery of said pad and resting on said balls, and a flexible casing enveloping said covering and the sides of said pad.

2. A tire comprising a resilient pad shaped to conform to the periphery of a wheel rim and having therein a plurality of radially-directed pockets located at spaced intervals, anchor bolts having their heads seated in the bottoms of said pockets and adapted to have their ends projected through a wheel-rim, springs seated in said pockets, a cup seated on the outer end of each spring, a ball seated in said cup, a flexible compressed asbestos pad cemented to the outer periphery of the first mentioned pad and inclosing said balls, and a protective covering for said pads.

In testimony whereof, I affix my signature in presence of two subscribing witnesses.

AUGUSTUS TYLER.

Witnesses:
H. E. DUNLAP,
S. M. LEWIS.